April 5, 1949.  A. H. KRAMER  2,466,114
MOWING ATTACHMENT FOR TRACTORS
Filed Feb. 15, 1944  3 Sheets-Sheet 2
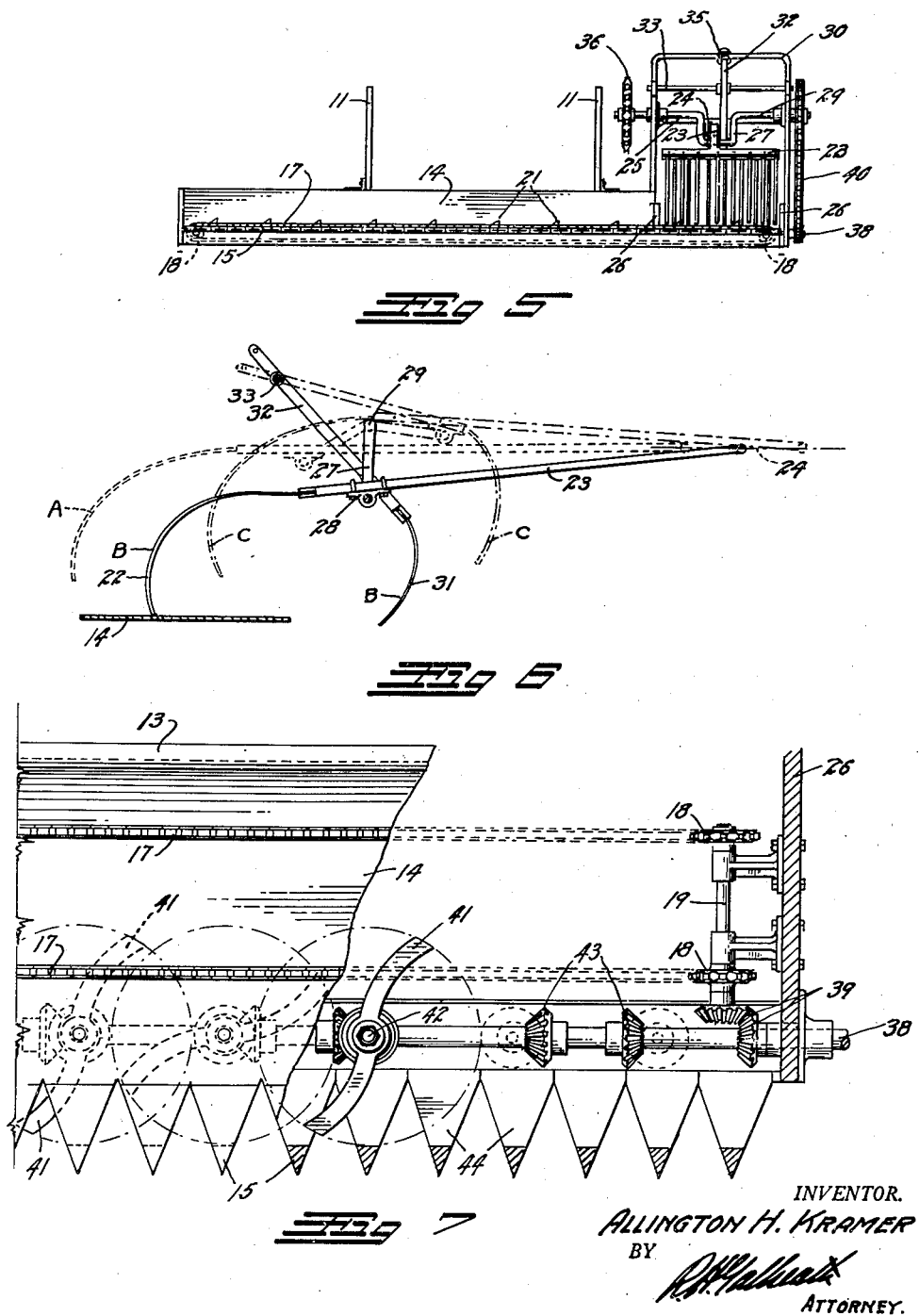
INVENTOR.
ALLINGTON H. KRAMER
BY
ATTORNEY.

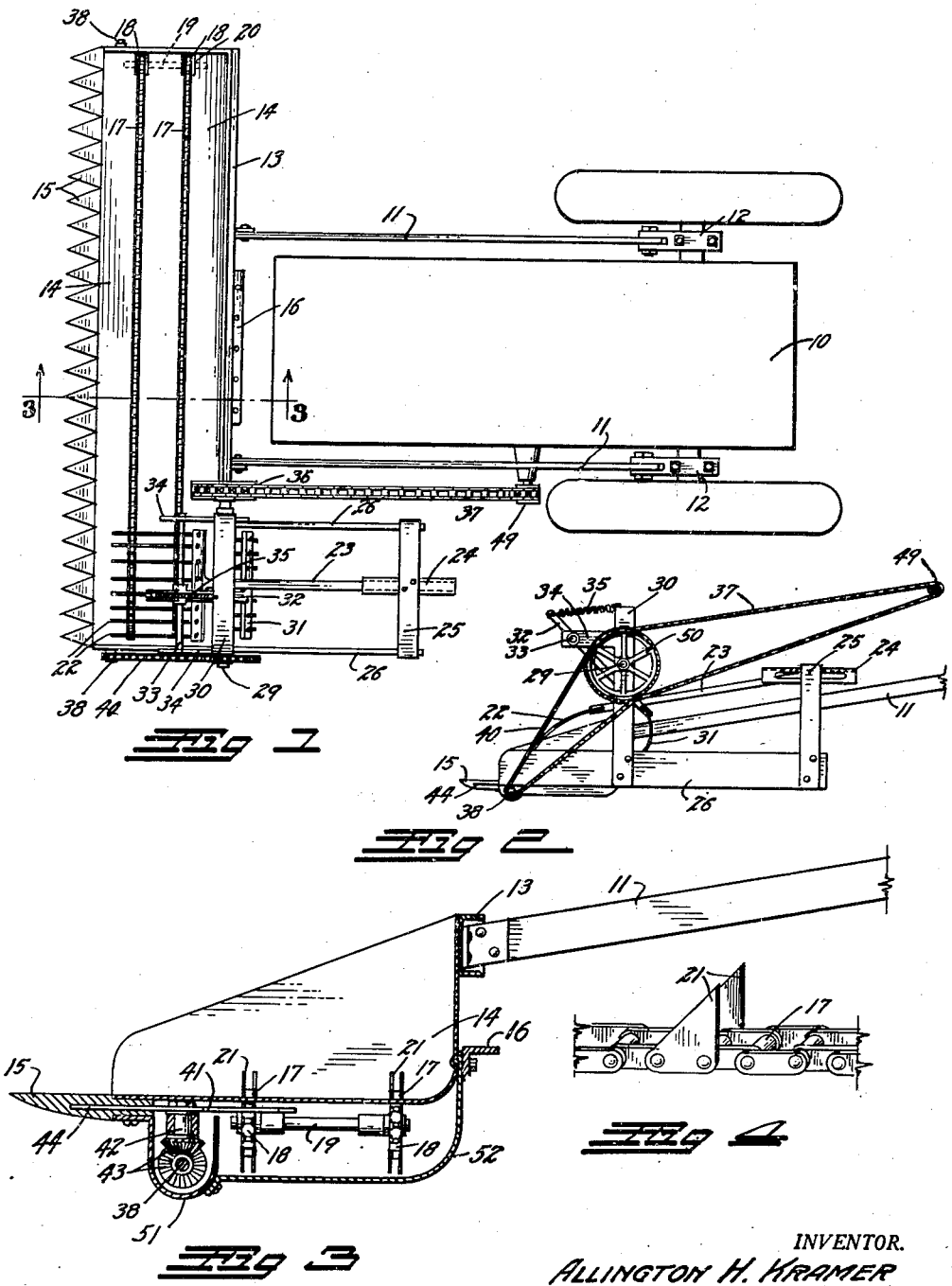

April 5, 1949.  A. H. KRAMER  2,466,114
MOWING ATTACHMENT FOR TRACTORS
Filed Feb. 15, 1944  3 Sheets-Sheet 3
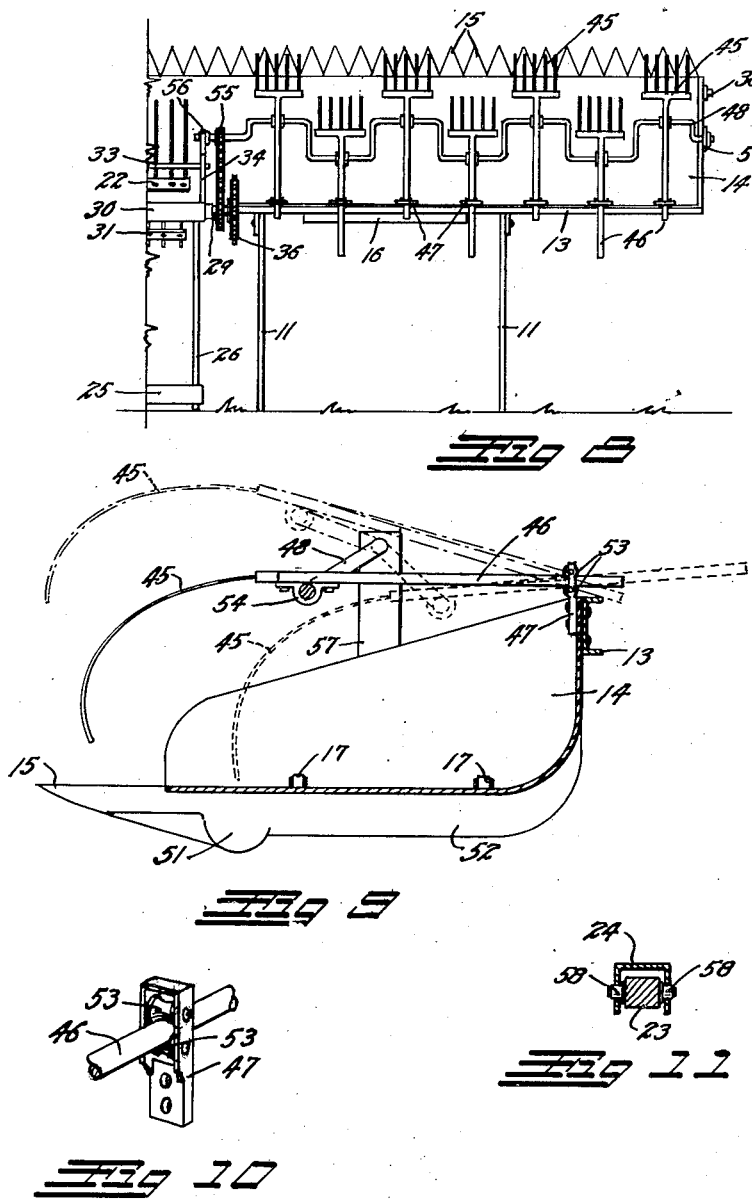
INVENTOR.
ALLINGTON H. KRAMER
BY
ATTORNEY Patented Apr. 5, 1949

2,466,114

UNITED STATES PATENT OFFICE 2,466,114

MOWING ATTACHMENT FOR TRACTORS

Allington H. Kramer, Aurora, Colo.

Application February 15, 1944, Serial No. 522,493

4 Claims. (Cl. 56—23)

1

This invention relates to a mower attachment for tractors and has for its principal object the provision of a simple and highly efficient attachment which can be quickly and easily applied to any standard tractor so as to mow a swath ahead of the tractor; gather the cut crop; form the latter into piles alongside of the path of the tractor; and obtain its operating power from the power take-off of the tractor.

Other objects and advantages reside in the detail construction of the attachment, which is designed for simplicity, economy and efficiency. These will become more apparent from the following description.

In the following detailed description of the invention, reference is had to the accompanying drawings forming a part hereof. Like numerals refer to like parts in all views of the drawing and throughout the description.

In the drawing:

Fig. 1 is a plan view of the improved mower attachment illustrating its relation to a standard tractor;

Fig. 2 is an end view thereof;

Fig. 3 is an enlarged cross-section through the crop gathering trough of the attachment, taken on the line 3—3, Fig. 1;

Fig. 4 is detail perspective view illustrating a type of conveyor chain which may be employed in the attachment;

Fig. 5 is a front view of the improved mower attachment;

Fig. 6 is a diagrammatic view illustrating the action of the gathering and piling rake of the device;

Fig. 7 is an enlarged fragmentary plan view, partly broken away, of the crop gathering trough illustrating the rotary sickle construction employed in the improved attachment;

Fig. 8 is a fragmentary plan view of the attachment illustrating sweep rakes which may be used in connection therewith;

Fig. 9 is a diagrammatic view illustrating phases in the operation of the sweep rakes;

Fig. 10 is a detail view illustrating the type of handle slide employed with the sweep rakes; and Fig. 11 is a detail cross section through the handle slide employed for supporting the rearward extremity of the gathering rake handle.

In the drawing the approximate position of a typical tractor is outlined at 10. The improved mower attachment is designed to be supported ahead of the tractor 10 across the path thereof as illustrated and may be attached to the tractor in any desired manner. As illustrated it is secured to the tractor by means of two longitudinally extending push bars 11 which extend rearwardly to connection 12 with the rear axle housing of the tractor. The push bars 11 are hingedly mounted at the rear and terminate at the front in a cross frame member 13 which is secured to and supports a sheet metal crop gathering trough 14. The front of the trough is open, the back and ends thereof are turned upwardly to form enclosing sides, and the bottom is substantially flat and horizontal. The cross frame member 13 is provided with an attachment bar 16 by means of which it may be attached on the tractor for supporting the trough 14.

A plurality of endless conveyor chains 17 extend throughout the length of the trough 14. The upper reach of each chain lies upon the bottom of the trough and the lower reach extends therebeneath. The chains are trained over sprockets 18 mounted upon sprocket shafts 19 at each extremity of the trough. Openings 20 are formed in the bottom of the trough through which the sprockets extend to pick up the chains. The chains are provided with prongs 21 at spaced apart intervals therealong to engage and carry the cut crop lengthwise of the trough as the chains travel.

As illustrated the chains are designed to convey the crop to the right end of the trough. The back of the trough at the latter extremity is cut away to allow the crop to be discharged from the rear thereof. The discharging is accomplished by means of a discharging rake 22 carried on the forward extremity of a rake handle 23. The rearward extremity of the rake handle 23 is provided with oppositely extending rollers 58 which travel in longitudinal slots formed in the sides of a slide member 24 to allow free longitudinal movement of the rake. The slide member 24 is supported in an arch bar 25 which in turn is supported from two side plates 26 extending rearwardly from the trough 14.

The forward extremity of the rake handle 23 is mounted on a crank 27 formed on a crank shaft 29. A suitable journal box 28 is provided for securing the crank to the handle. The crank shaft 29 is journalled in a forward arch bar 30, which is also supported from the side plates 26.

It can be readily seen that if the crank shaft 29 is rotated forwardly, the forward extremity of the rake 22 will be swung rearwardly over the surface of the trough to sweep the accumulated crop from the rear of the trough and will then swing upwardly and forwardly to again engage the crop and sweep it rearwardly. Means must be provided to prevent the crop from spilling over the back of the open end of the trough until it is desired to make a pile thereof. This is accomplished by means of gate rake 31 carried on a handle 32, the forward extremity of which is hingedly mounted on a hinge rod 33 which is supported in forwardly extending arms 34 from the arch 30. The handle 32 extends above the rod 33 terminating in a tension spring 35. The spring 35 is stretched back to the arch 30 so as to constantly urge the gate rake 31 downwardly and forwardly. The handle 32 rests, intermediate its extremities, upon the crank 27 so that as the crank rotates upwardly at the rear it will lift the gate rake 31.

The crank shaft 29 is driven from the power take-off of the tractor in any desired manner depending upon the particular type of tractor available. As illustrated, the shaft is provided with a sprocket 36 which is designed to be connected by means of a suitable transmission chain, such as indicated at 37, to a power take-off 49 on the tractor.

It can be readily seen that as the tractor moves forward the hay or grain cut by the sickle will fall upon the bottom of the trough 14 and be carried by the conveyor chains 17 to form a pile beneath the rake 22. The crank shaft rotates relatively slowly so that at intervals the rake 22 will sweep forwardly and downwardly in front of the crop pile as shown at "A," Fig. 6, drawing it rearwardly against the gate rake 31, until both rakes 22 and 31 are in the pile forming position as illustrated at "B" in Fig. 6. The crank 27 will then contact the handle 32 of the gate rake and lift the latter, until both rakes are in the pile dropping position as indicated at "C" in Fig. 6, to discharge the crop in a pile upon the ground. The rake 22 will then return to its former position "A" and the rake 31 will return to its position "B" for another cycle of operation.

The conveyor chains 17 are driven from a sickle shaft 38 through the medium of mitre gears 39 and the sickle shaft is driven from the crank shaft 29 through the medium of a relatively large drive sprocket 50 and power chain 40. The large sprocket 50 causes the sickle shaft to rotate at a much higher speed than the crank shaft.

The improved rotary sickle employs a plurality of sickle teeth or guards 15 secured to and projecting forwardly from the front edge of the trough 14. The guards 15 are slotted horizontally as indicated at 44 for the passage of rotary sickle blades 41, there being one of the blades 41 mounted on a blade shaft 42 behind each alternate guard 15. This arrangement causes each of the blades to traverse three of the guards and across two intervening spaces between the guards. The blade shafts 42 are driven from the sickle shaft 38 through bevel gears 43 which are so arranged along the sickle shaft that the adjacent blades will rotate in opposite directions. The cutting is done between the edges of the guard slots 44 and the blades. The slot edges may be reinforced by means of renewable ledger plates as is usual in sickle construction.

The improved mower attachment for tractors as above described will serve efficiently without further addition under all normal conditions. For unusually short crops and grasses it may be found desirable to provide means for sweeping the stalks across the sickle teeth and into the paths of the conveyor chains. Such a provision is illustrated in Figs. 8, 9, and 10 of the drawing.

The latter form employs a plurality of sweep rakes 45 for sweeping the crop onto the trough. The rakes 45 are carried on the forward extremities of rake handles 46 which are secured through suitable bearings 54 to oppositely extending cranks formed in a crank shaft 48 which extends throughout the length of the trough 14 above the latter. The rearward extremities of the handles 46 reciprocate between guide rollers 53 carried in guide members 47 along the back of the trough. The crank shaft 48 is rotated from the crank shaft 29, and at a much higher speed than the latter, by means of a suitable sprocket chain 55. The action of the sweep rakes 45 is illustrated in broken line in Fig. 9. The remainder of the attachment is similar to that previously described.

While a specific form of the improved mower attachment has been described and illustrated herein, it is desired to be understood that the same may be varied without departing from the spirit of the invention so long as said variations are within the scope of the appended claims.

Having thus described the invention, what is claimed and desired secured by Letters Patent is:

1. Means for discharging the cut crop from a mower comprising: a discharge rake; means for reciprocating said rake across one extremity of said mower so that it will sweep the accumulated crop from said mower at intervals; a gate rake positioned to maintain said crop on said mower intermediate the sweeps of said discharge rake; and means for swinging said gate rake from the path of said discharge rake during the sweeping movement thereof to allow said crop to discharge at pre-set times.

2. Crop receiving and discharging means for a mower comprising: a transversely extending, crop-receiving trough; a front arch member; a rear arch member, said members being supported from said trough; a crank mounted in said front arch member; a slide member supported by said rear arch member; a discharge rake; a first handle extending rearwardly from said discharge rake, said handle being supported by said crank adjacent to the forward extremity of the former, the rearward extremity thereof being reciprocally mounted in said slide member; means for rotating said crank to cause the discharge rake to sweep the crop from said trough; a gate rake positioned in the path of the crop discharging from said discharge rake; and a second handle extending upwardly from said gate rake in the path of said crank so that when the latter moves rearwardly, it will strike said second handle to lift said gate rake from the path of the crop.

3. Crop receiving and discharging means for a mower comprising: a transversely extending, crop-receiving trough; a front arch member; a rear arch member, said members being supported from said trough; a crank mounted in said front arch member; a slide member supported by said rear arch member; a discharge rake; a first handle extending rearwardly from said discharge rake, said handle being supported by said crank adjacent to the forward extremity of the former, the rearward extremity thereof being reciprocally mounted in said slide member; means for rotating said crank to cause the discharge rake to sweep the crop from said trough; a gate rake positioned in the path of the crop discharging from said discharge rake; a second handle extending upwardly from said gate rake in the path of said crank so that when the latter moves rearwardly, it will strike said second handle to lift said gate rake from the path of the crop; and resilient means urging said gate rake into the path of the crop.

4. Crop receiving and discharging means for a mower comprising: a transversely extending, crop-receiving trough; a front arch member; a rear arch member, said members being supported from said trough; a crank shaft mounted in said front arch member; a crank on said crank shaft; a slide member supported by said rear arch member; a discharge rake; a first handle extending rearwardly from said discharge rake, said handle being supported by said crank adjacent to the forward extremity of the former, the rearward extremity thereof being reciprocally mounted in said slide member; means for rotating said crank to the discharge rake to sweep the crop from said trough; a gate rake positioned in the path of the crop discharging from said discharge rake; a second handle extending upwardly from said gate rake in the path of said crank so that when the latter moves rearwardly, it will strike said second handle to lift said gate rake from the path of the crop; resilient means urging said gate rake into the path of the crop; a second crank shaft extending over and throughout the length of said trough; a plurality of oppositely extending cranks formed on said second crank shaft; a sweep rake handle mounted intermediate its extremities on each of said latter cranks; a sweep rake mounted on the forward extremity of each handle; guide means at the rear of said trough for guiding the rear extremities of said sweep rake handles; and means for driving said second crank shaft from said first crank shaft at a higher speed than the latter.

ALLINGTON H. KRAMER.

REFERENCES CITED

The following references are of record in the file of this patent:

UNITED STATES PATENTS

| Number | Name | Date |
|---|---|---|
| 10,904 | Roberts | May 16, 1854 |
| 99,444 | Jeffries | Feb. 1, 1870 |
| 201,579 | Wheeler, Jr. | Mar. 19, 1878 |
| 216,706 | Sriver et al. | June 17, 1879 |
| 261,787 | Temperton | July 25, 1882 |
| 503,152 | Marshall | Aug. 15, 1893 |
| 508,395 | Baird | Nov. 14, 1893 |
| 741,888 | Clark | Oct. 20, 1903 |
| 1,397,365 | Cook | Nov. 15, 1921 |
| 1,710,749 | Svendsgaard | Apr. 30, 1929 |
| 1,954,629 | Kettenbach et al. | Apr. 10, 1934 |
| 1,954,630 | Livesay | Apr. 10, 1934 |
| 2,071,844 | Korsmo et al. | Feb. 23, 1937 |